(12) United States Patent
Sakai et al.

(10) Patent No.: US 12,413,129 B2
(45) Date of Patent: Sep. 9, 2025

(54) MAGNETIC GEARED ELECTRICAL MACHINE AND POWER GENERATION SYSTEM USING THE SAME

(71) Applicant: MITSUBISHI HEAVY INDUSTRIES, LTD., Tokyo (JP)

(72) Inventors: Masayuki Sakai, Tokyo (JP); Yasutaka Aoki, Tokyo (JP); Atsushi Yuge, Tokyo (JP); Takatoshi Matsushita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 284 days.

(21) Appl. No.: 18/272,903

(22) PCT Filed: Jan. 25, 2022

(86) PCT No.: PCT/JP2022/002506
§ 371 (c)(1),
(2) Date: Jul. 18, 2023

(87) PCT Pub. No.: WO2022/163603
PCT Pub. Date: Aug. 4, 2022

(65) Prior Publication Data
US 2024/0097546 A1    Mar. 21, 2024

(30) Foreign Application Priority Data
Jan. 29, 2021    (JP) .................................. 2021-012757

(51) Int. Cl.
*H02K 9/18* (2006.01)
*H02K 49/10* (2006.01)
*H02K 7/18* (2006.01)

(52) U.S. Cl.
CPC ............. *H02K 49/102* (2013.01); *H02K 9/18* (2013.01); *H02K 7/183* (2013.01)

(58) Field of Classification Search
CPC ............. H02K 9/00; H02K 9/10; H02K 9/18; H02K 9/22; H02K 9/227; H02K 16/00;
(Continued)

(56) References Cited

U.S. PATENT DOCUMENTS 7,804,215 B2    9/2010  Hemmelmann et al.
9,219,395 B2   12/2015  Powell et al.
(Continued)

FOREIGN PATENT DOCUMENTS

CN    210444135 U    5/2020
JP    3702825 B2 * 10/2005 ............... H02K 5/20
(Continued)

OTHER PUBLICATIONS

The Extended European Search Report dated May 23, 2024, issued to the corresponding EP Application No. 22745824.7 (9 pages).

*Primary Examiner* — Tran N Nguyen
(74) *Attorney, Agent, or Firm* — Osha Bergman Watanabe & Burton LLP

(57) ABSTRACT

A magnetic geared electrical machine includes: a stator including a stator coil; a first rotor including a plurality of pole pieces; a second rotor including a plurality of rotor magnets, and arranged opposite to the stator across the first rotor in a radial direction; a housing having a first inlet opening and a second inlet opening, and supporting the stator; a first inlet cavity defined by at least the housing so as to communicate with the first inlet opening provided in the housing and with a first radial gap between the stator and the first rotor; and a second inlet cavity defined by at least the housing so as to communicate with the second inlet opening provided in the housing and with a second radial gap between the first rotor and the second rotor.

15 Claims, 10 Drawing Sheets

(58) Field of Classification Search
CPC ............ H02K 16/02; H02K 7/00; H02K 7/11;
H02K 5/00; H02K 5/20; H02K 5/203;
H02K 49/00; H02K 49/102; F03D 80/00;
F03D 80/60; F03D 9/00; F03D 9/25
See application file for complete search history.

(56) References Cited

U.S. PATENT DOCUMENTS

| | | | |
|---|---|---|---|
| 2007/0186692 A1* | 8/2007 | Waszak | H02K 1/16 73/862.331 |
| 2023/0045743 A1 | 2/2023 | Sakai et al. | |
| 2023/0049224 A1 | 2/2023 | Sakai et al. | |

FOREIGN PATENT DOCUMENTS

| | | | |
|---|---|---|---|
| JP | 2012-246982 A | 12/2012 | |
| JP | 2021-116843 A | 8/2021 | |
| JP | 2021-118591 A | 8/2021 | |

* cited by examiner

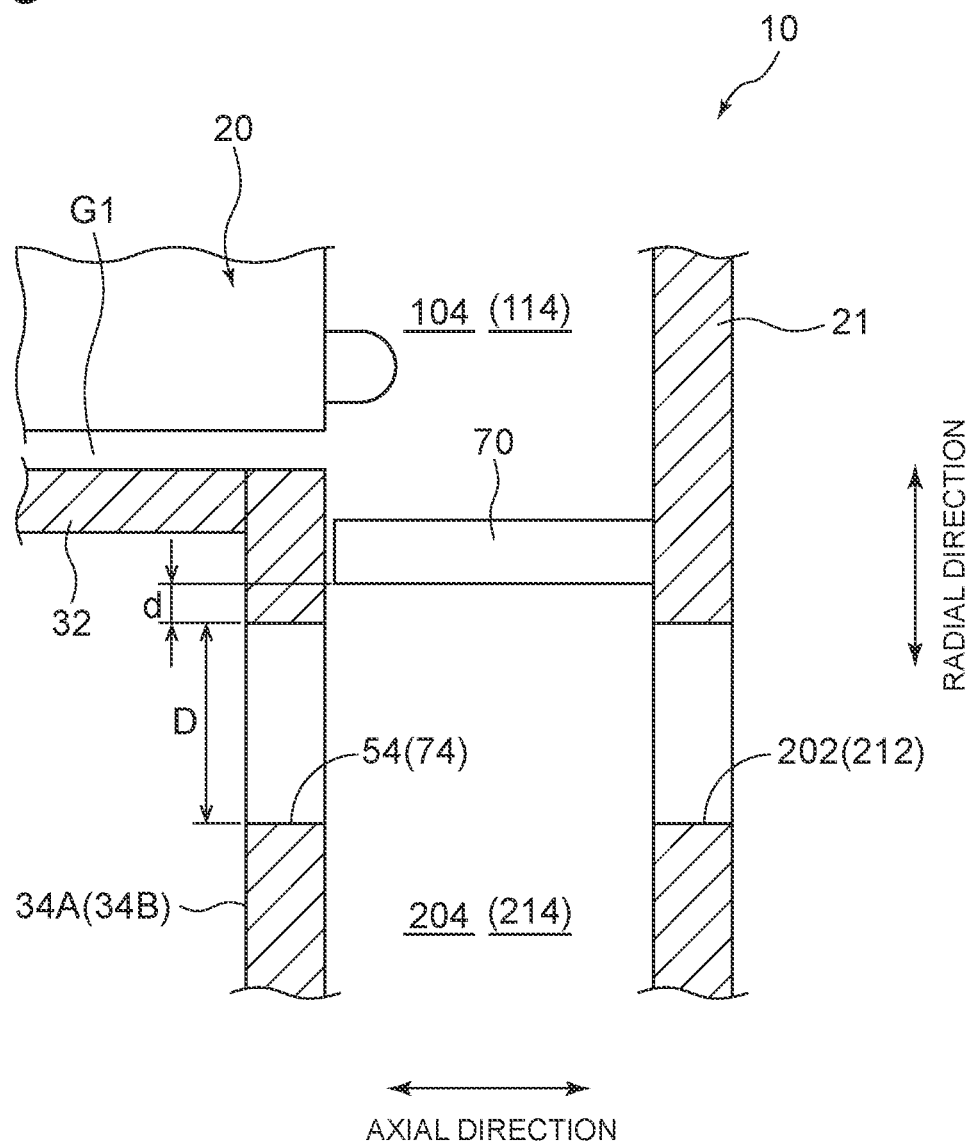

MAGNETIC GEARED ELECTRICAL MACHINE AND POWER GENERATION SYSTEM USING THE SAME

TECHNICAL FIELD

The present disclosure relates to a magnetic geared electrical machine and a power generation system using the same.

This application claims the priority of Japanese Patent Application No. 2021-012757 filed on Jan. 29, 2021, the content of which is incorporated herein by reference.

BACKGROUND ART

Conventionally, a magnetic geared electrical machine is known that combines a magnetic gear device for converting a rotation speed between a high-speed rotor and a low-speed rotor with a generator or an electric motor.

For example, Patent Document 1 describes a magnetic geared electrical machine that comprises a first rotor including a support structure, a second rotor, and a stator, and is configured such that at least one of the second rotor and stator accommodates the support structure.

Further, although not related to the magnetic geared electrical machine, Patent Document 2 describes a magnetic gear device in which a cooling medium flow path is disposed between electromagnetic steel magnetic path members (pole pieces) arranged in the circumferential direction.

CITATION LIST

Patent Literature

Patent Document 1: U.S. Pat. No. 9,219,395B
Patent Document 2: JP2012-246982A

SUMMARY

Problems to be Solved

In the magnetic geared electrical machine described in Patent Document 1, for example, as a countermeasure against heat generation due to copper loss in the stator coils or iron loss in the pole pieces, each part of the magnetic geared electrical machine is cooled as appropriate.

The amount of heat generated is not always equal on the stator-side region and the rotor-side region of the magnetic geared electrical machine, with the pole pieces as the boundary. Also, the amount of heat dissipated outside the system by heat conduction, heat transfer, and radiation is not always equal on the stator-side region and the rotor-side region of the magnetic geared electrical machine, with the pole pieces as the boundary.

Therefore, cooling design according to the amount of heat generated or dissipated in each region on both sides of the pole pieces in the radial direction of the magnetic geared electrical machine is desirable.

In the magnetic gear device described in Patent Document 2, cooling design that takes into account the amount of heat generated or dissipated in each region on both sides of the pole pieces is impossible because cooling medium flow paths are formed between the circumferentially arranged pole pieces.

In view of the above, an object of some embodiments of the present invention is to provide a magnetic geared electrical machine that facilitates cooling design according to the amount of heat generated or dissipated in each region on both sides of the pole pieces in the radial direction.

Solution to the Problems

A magnetic geared electrical machine according to at least one embodiment of the present invention includes: a stator including a stator coil; a first rotor including a plurality of pole pieces; a second rotor including a plurality of rotor magnets, and arranged opposite to the stator across the first rotor in a radial direction; a housing having a first inlet opening and a second inlet opening, and supporting the stator; a first inlet cavity defined by at least the housing so as to communicate with the first inlet opening provided in the housing and with a first radial gap between the stator and the first rotor; and a second inlet cavity defined by at least the housing so as to communicate with the second inlet opening provided in the housing and with a second radial gap between the first rotor and the second rotor.

Advantageous Effects

According to at least one embodiment of the present invention, it is possible to easily make cooling design according to the amount of heat generated or dissipated in each region on both sides of the pole pieces in the radial direction.

BRIEF DESCRIPTION OF DRAWINGS

FIG. 9 is a diagram showing another arrangement example of the partition member.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

(Overview of Magnetic Geared Electrical Machine)

Figure 1A:
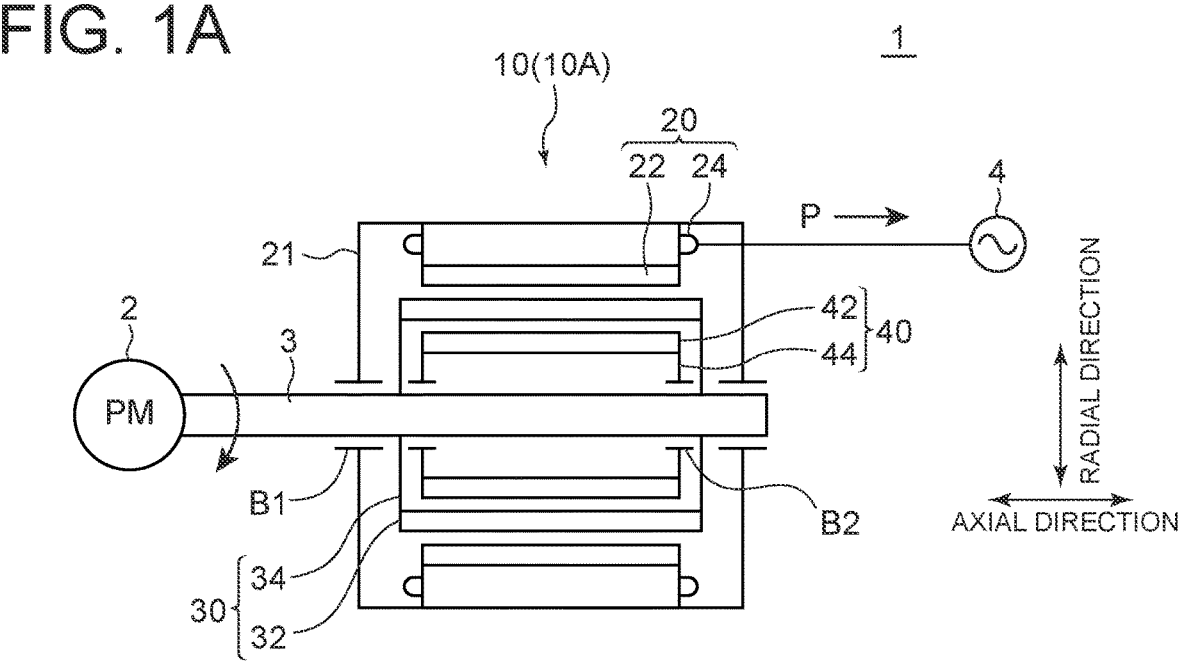
FIG. 1A is a schematic view showing an example of a magnetic geared electrical machine.
Figure 1B:
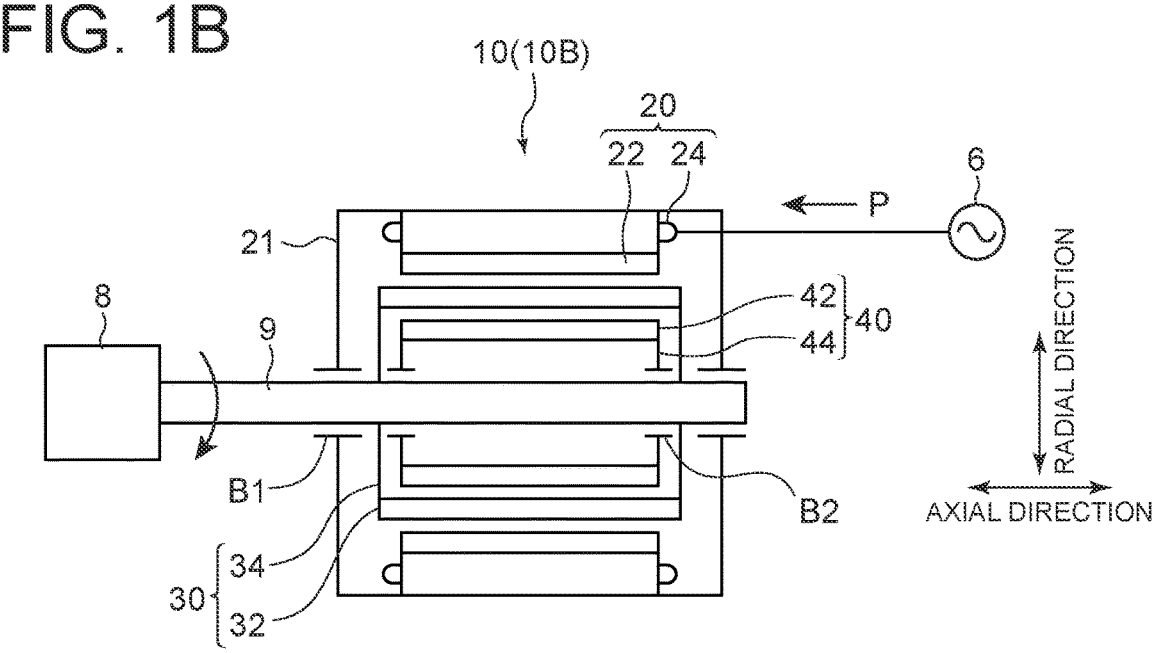
FIG. 1B is a schematic view showing another example of the magnetic geared electrical machine.

FIGS. 1A and 1B are each a schematic view showing an example of a magnetic geared electrical machine. Herein, in FIGS. 1A and 1B, the "axial direction" is a direction parallel to a rotational axis of a rotor (30, 40) of a magnetic geared electrical machine 10, and the "radial direction" is a direction orthogonal to the rotational axis of the rotor (30, 40).

In an embodiment, as shown in FIG. 1A, the magnetic geared electrical machine 10 is a magnetic geared generator 10A configured to be driven by a prime mover 2 to generate power and supply electric power P generated by the power generation to a power supply destination 4 which may be, for example, a power grid.

In another embodiment, as shown in FIG. 1B, the magnetic geared electrical machine 10 is a magnetic geared motor 10B configured to drive a rotating machine 8 upon receiving the electric power P supplied from a power supply source 6 which may be, for example, a power grid.

In the embodiment shown in FIG. 1A, the magnetic geared generator 10A constitutes part of a power generation system 1. The power generation system 1 may be, for example, a renewable energy power generation system such as a wind power generation system or a tidal current power generation system. If the power generation system 1 is a wind power generation system, the prime mover 2 is a wind turbine rotor.

The magnetic geared generator 10A includes a stator 20 with a stator magnet 22 and a stator coil 24, a first rotor 30 with a pole piece 32, and a second rotor 40 with a rotor magnet 42. In the example shown in FIG. 1A, the stator 20 is arranged inside a housing 21 for supporting a rotational shaft 3 of the prime mover 2 via a bearing B1. The first rotor 30 is configured to rotate with the rotational shaft 3 of the prime mover 2. The first rotor 30 includes first end plates 34 respectively disposed at both axial ends of the pole piece 32, and each of the first end plates 34 is connected to the rotational shaft 3. The second rotor 40 includes second end plates 44 respectively disposed at the both axial ends of the rotor magnet 42. Each of the second end plates 44 is mounted on the rotational shaft 3 (or the first rotor 30 rotating together with the rotational shaft 3) via the bearing B2 so as to allow the second rotor 40 to rotate faster than the rotational shaft 3 and the first rotor 30. The second rotor 40 is disposed within the region surrounded by the first rotor 30 including the pole piece 32 and the first end plates 34 and the rotational shaft 3.

In the embodiment shown in FIG. 1A, the magnetic geared generator 10A has a configuration in which the stator 20, the first rotor 30, and the second rotor 40 are arranged in order radially inward. In another embodiment, the magnetic geared generator 10A has a configuration in which the second rotor 40, the first rotor 30, and the stator 20 are arranged in order radially inward. In this case, the second rotor 40, the first rotor 30, and the stator 20 are arranged radially inward of the cylindrical rotational shaft 3.

The above-described magnetic geared generator 10A is an integrated combination of a magnetic gear and a generator, and is configured to convert a mechanical input from the prime mover 2 into power by utilizing a harmonic type magnetic gear principle and electromagnetic induction.

For example, power generation in the magnetic geared generator 10A may be performed according to the following principle. A magnetic flux of the stator magnet 22 is modulated by the pole piece 32 of the first rotor (low-speed rotor) 30 rotating together with the rotational shaft 3 of the prime mover 2, and the rotor magnet 42 receives a magnetic force from the modulated magnetic field, thereby rotating the second rotor (high-speed rotor) 40. At this time, the ratio (speed increasing ratio) of the rotation speed of the second rotor (high-speed rotor) 40 to the first rotor (low-speed rotor) 30 is expressed by a ratio of the number of poles Ni, of the pole piece 32 to the number of pole pairs NH of the rotor magnet 42 (=NL/NH). When the second rotor (high-speed rotor) 40 rotates, an electric current is generated in the stator coil 24 by electromagnetic induction.

In the embodiment shown in FIG. 1B, the basic configuration of the magnetic geared motor 10B is common to the magnetic geared generator 10A shown in FIG. 1A.

That is, the magnetic geared motor 10B includes the stator 20 with the stator magnet 22 and the stator coil 24, the first rotor 30 with the pole piece 32, and the second rotor 40 with the rotor magnet 42. In the example shown in FIG. 1B, the stator 20 is fixed to the inside of the housing 21 for supporting a rotational shaft 9 of the rotating machine 8 via the bearing B1. The first rotor 30 includes first end plates 34 respectively disposed at both axial ends of the pole piece 32, and each of the first end plates 34 is connected to the rotational shaft 9. The second rotor 40 includes second end plates 44 respectively disposed at the both axial ends of the rotor magnet 42. Each of the second end plates 44 is mounted on the rotational shaft 9 (or the first rotor 30 rotating together with the rotational shaft 9) via the bearing B2 so as to allow the second rotor 40 to rotate faster than the rotational shaft 9 and the first rotor 30. The second rotor 40 is disposed within the region surrounded by the first rotor 30 including the pole piece 32 and the first end plates 34 and the rotational shaft 9.

In the embodiment shown in FIG. 1B, the magnetic geared motor 10B has a configuration in which the stator 20, the first rotor 30, and the second rotor 40 are arranged in order radially inward. In another embodiment, the magnetic geared motor 10B has a configuration in which the second rotor 40, the first rotor 30, and the stator 20 are arranged in order radially inward. In this case, the second rotor 40, the first rotor 30, and the stator 20 are arranged radially inward of the cylindrical rotational shaft 9.

The magnetic geared motor 10B is an integrated combination of a magnetic gear and a motor, rotates the second rotor (high-speed rotor) 40 by a rotating magnetic field generated by energizing the stator coil 24, and utilizes the principle of a harmonic magnetic gear to transmit power from the second rotor (high-speed rotor) 40 to the first rotor (low-speed rotor) 30.

(Internal Structure of Magnetic Geared Electrical Machine)

Subsequently, an internal structure of the above-described magnetic geared electrical machine 10 (10A, 10B) will be described with reference to FIG. 2.

Figure 2:
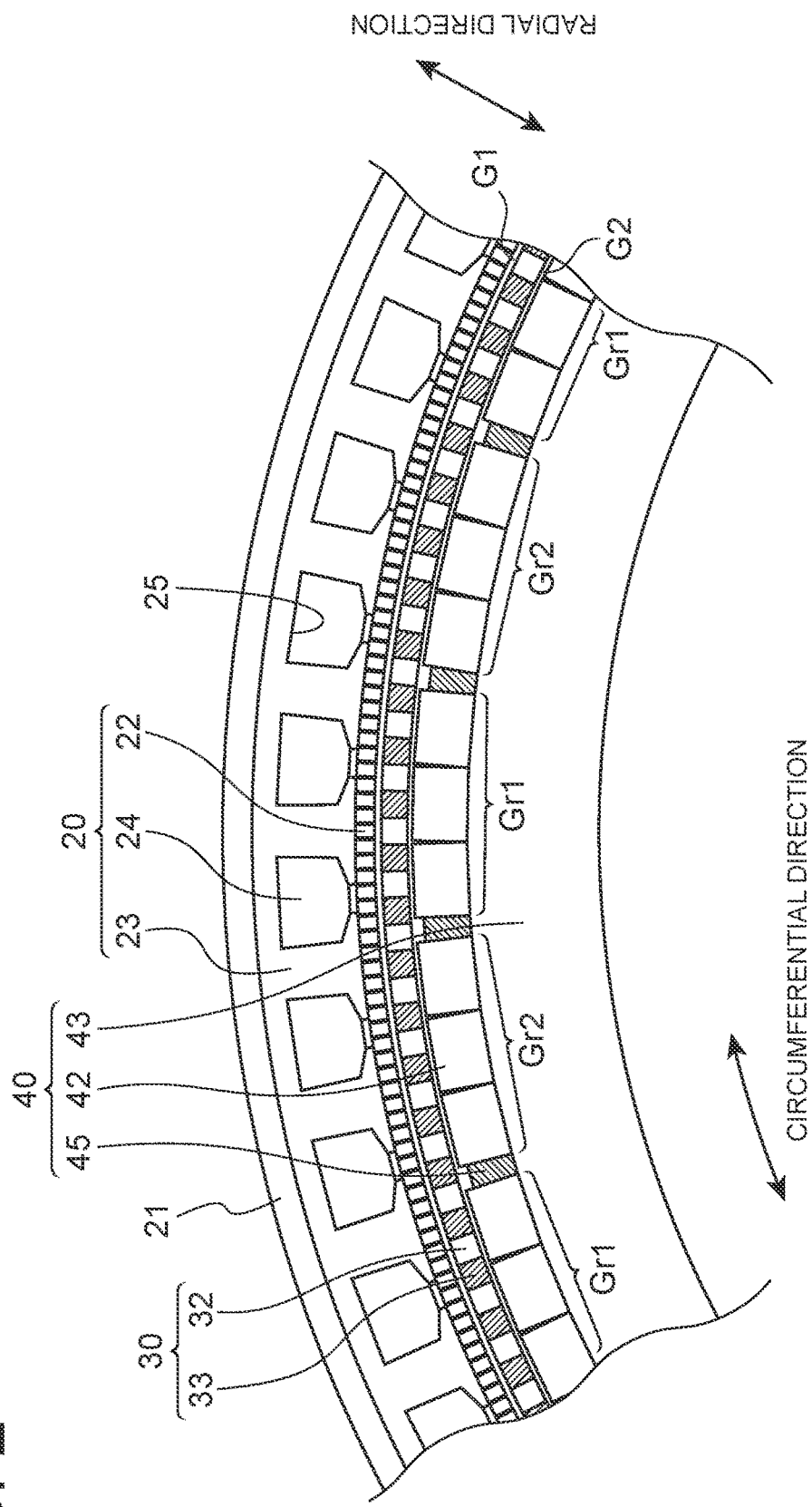
FIG. 2 is a radial cross-sectional view of the magnetic geared electrical machine according to an embodiment.

FIG. 2 is a radial cross-sectional view of the magnetic geared electrical machine 10 according to an embodiment.

As shown in FIG. 2, the stator 20 of the magnetic geared electrical machine 10 includes a plurality of stator magnets 22 and stator coils 24 arranged in the circumferential direction. The stator magnets 22 and the stator coils 24 are attached to a stator core 23.

The stator magnets 22 are composed of permanent magnets, and the plurality of stator magnets 22 are disposed in the circumferential direction so as to axially pass between the stator coils 24 and the first rotor 30 in the radial direction. In the example shown in FIG. 2, each of the stator magnets 22 is an axially elongated rod-shaped member having a rectangular cross section. That is, a dimension of each side of the rectangular cross section of the stator magnet 22 shown in FIG. 2 is sufficiently less than an axial dimension of the stator magnet 22 shown in FIGS. 1A and 1B.

FIG. 2 shows a structural example of a surface permanent magnet (SPM) in which the stator magnets 22 are attached to the surface of the stator core 23. In another embodiment, the stator 20 may have a structure of an interior permanent magnet (IPM) in which the stator magnets 22 are embedded in the stator core 23.

The stator coils 24 are disposed within a plurality of slots 25 disposed in the stator core 23. The plurality of slots 25 are disposed in the circumferential direction, and each of the slots 25 extends in the axial direction. Both axial ends of each of the slots 25 are open, and coil ends of the stator coil 24 that do not fit into the slot 25 may protrude from the stator core 23 at both axial ends of the stator core 23.

The first rotor 30 opposed to the stator 20 of the above-described configuration in the radial direction includes a plurality of pole pieces 32 arranged in the circumferential direction with a first radial gap G1 between the stator 20 and the first rotor 30. Each of the pole pieces 32 is composed of a magnetic material such as an electromagnetic steel plate or a powder magnetic core, and is an axially elongated rod-shaped member having the rectangular cross section (see FIG. 2). That is, a dimension of each side of the rectangular cross section of the pole piece 32 shown in FIG. 2 is sufficiently less than an axial dimension of the pole piece 32 shown in FIGS. 1A and 1B.

Besides the pole pieces 32, the first rotor 30 may include other members such as a non-magnetic member 33 (see FIG. 2) which is composed of a non-magnetic material and connects the pole pieces 32 in the circumferential direction and the first end plates 34 described above with reference to FIGS. 1A and 1B.

The non-magnetic member 33 may be a fiber reinforced plastic (FRP) in which reinforcing fibers are combined with a matrix resin and may be, for example, CFRP using carbon fibers as reinforcing fibers or GFRP using glass fibers as reinforcing fibers. The first end plate 34 is an annular plate extending along the radial direction from a connection position with the rotational shaft 3, 9 toward the pole piece 32.

As shown in FIG. 2, the second rotor 40 is disposed opposite to the stator 20 across the first rotor 30 of the above-described configuration in the radial direction with a second radial gap G2 between the first rotor 30 and the second rotor 40. The second rotor 40 may be arranged to be surrounded by the first rotor 30 including the pole piece 32, the non-magnetic member 33, and the first end plate 34 as described above with reference to FIGS. 1A and 1B.

The first radial gap G1 between the stator 20 and the first rotor 30 and the second radial gap G2 between the first rotor 30 and the second rotor 40 may have substantially the same size, for example, 0.95≤G1/G2≤1.05.

The second rotor 40 includes a plurality of rotor magnets 42 each of which is composed of a permanent magnet, and the plurality of rotor magnets 42 are arranged in the circumferential direction. Each of the rotor magnets 42 may be an axially elongated rod-shaped member having the rectangular cross section (see FIG. 2). Herein, the rotor magnet 42 is "axially elongated" means that a dimension of each side of the rectangular cross section of the rotor magnet 42 shown in FIG. 2 is sufficiently less than an axial dimension of the rotor magnet 42 shown in FIGS. 1A and 1B.

FIG. 2 shows a structural example of a surface permanent magnet (SPM) in which the rotor magnet 42 is attached to the surface of the rotor core 43. In another embodiment, the second rotor 40 may have a structure of an interior permanent magnet (IPM) in which the rotor magnet 42 is embedded in the rotor core 43.

Further, in the exemplary embodiment shown in FIG. 2, the plurality of rotor magnets 42 form at least two magnet groups (Gr1, Gr2) arranged with gaps in the circumferential direction on the surface of the rotor core 43. For example, each of the magnet groups (Gr1, Gr2) is composed of the plurality of rotor magnets 42 having the same magnetization direction.

Besides the rotor magnets 42 and the rotor core 43, the second rotor 40 may include other members such as the second end plates 44 described above with reference to FIGS. 1A and 1B and a closure member 45 for filling the circumferential gap between the rotor magnets 42.

The second end plate 44 is an annular plate extending along the radial direction from a mounting position of the bearing B2 toward the rotor core 43.

Further, the closure member 45 may be a fiber reinforced plastic (FRP) in which reinforcing fibers are combined with a matrix resin and may be, for example, CFRP using carbon fibers as reinforcing fibers or GFRP using glass fibers as reinforcing fibers. As shown in FIG. 2, the closure member 45 may close at least part of the circumferential gap between the magnet groups (Gr1, Gr2) alternately arranged in the circumferential direction. In this case, a height from the rotor core 43 to a surface of the closure member 45 may be less than a protrusion height of each rotor magnet 42 from the rotor core 43.

In the exemplary embodiment shown in FIG. 2, the number of stator coils 24, rotor magnets 42, pole pieces 32, and stator magnets 22 are in ascending order.

(Cooling Structure of Magnetic Geared Electrical Machine)

In the magnetic geared electrical machine 10 (10A, 10B) configured as described above, as a countermeasure against heat generation due to copper loss in the stator coil 24 or iron loss in the pole piece 32, the magnetic geared electrical machine 10 is internally provided with a cooling gas flow path.

Figure 3:
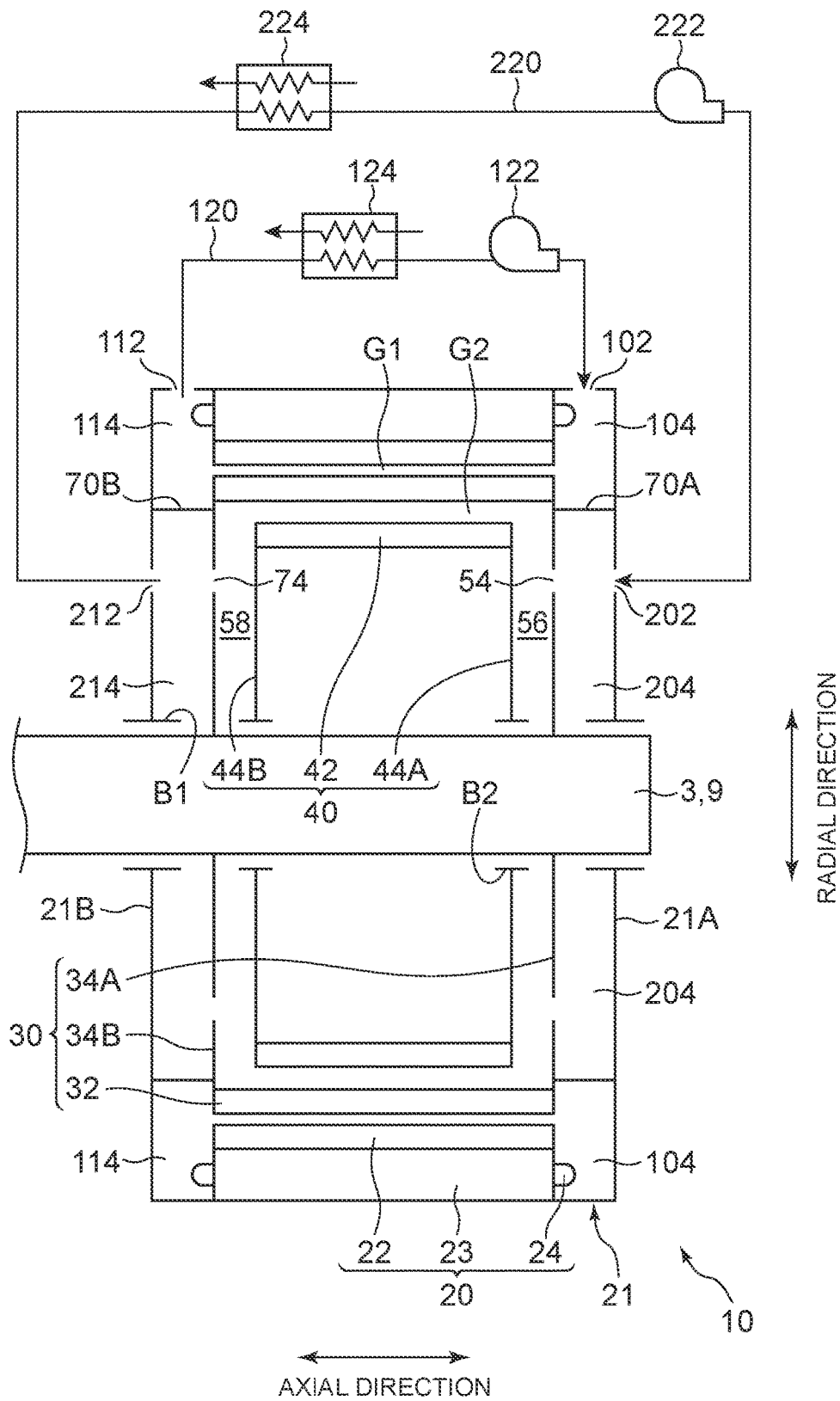
FIG. 3 is a diagram showing the magnetic geared electrical machine according to an embodiment.
Figure 4:
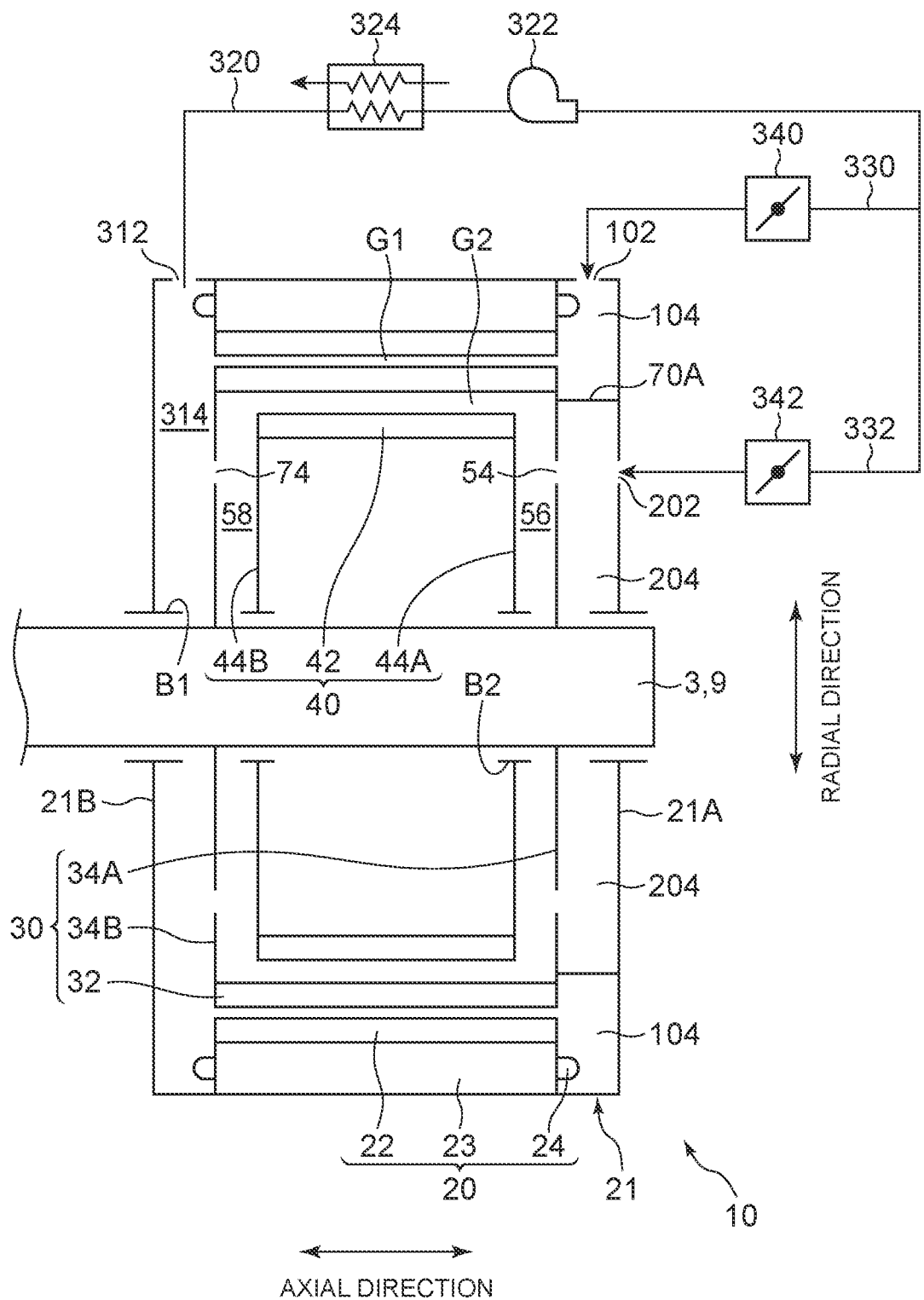
FIG. 4 is a diagram showing the magnetic geared electrical machine according to another embodiment.

FIG. 3 is a diagram showing the magnetic geared electrical machine 10 according to an embodiment. FIG. 4 is a diagram showing the magnetic geared electrical machine 10 according to another embodiment.

In some embodiments, as shown in FIGS. 3 and 4, the housing 21 which supports the stator 20 has a first inlet opening 102 for taking in a first cooling gas and a second inlet opening 202 for taking in a second cooling gas. The first cooling gas and the second cooling gas may be the same gas or different types of gases.

The first inlet opening 102 communicates with a first inlet cavity 104 defined by at least the housing 21. The first inlet cavity 104 communicates with a first radial gap G1 between the stator 20 and the first rotor 30.

Similarly, the second inlet opening 202 communicates with a second inlet cavity 204 defined by at least the housing 21. The second inlet cavity 204 communicates with a second radial gap G2 between the first rotor 30 and the second rotor 40.

In the examples shown in FIGS. 3 and 4, the coil end formed by protruding the stator coil 24 from the stator core 23 in the axial direction faces the first inlet cavity 104.

Thus, two mutually independent cooling gas flows (i.e., a first cooling gas flow from the first inlet opening 102 through the first inlet cavity 104 and a second cooling gas flow from the second inlet opening 202 through the second inlet cavity 204) are formed inside the magnetic geared electrical machine 10.

This facilitates cooling design according to the amount of heat generated or dissipated in each region on both sides of the pole pieces 32 of the magnetic geared electrical machine 10.

In the embodiments shown in FIGS. 3 and 4, a partition member 70A is disposed between the first inlet cavity 104 and the second inlet cavity 204.

By separating the inlet cavities (104, 204) by the partition member 70A, two mutually independent flows (i.e., a first flow through the first radial gap G1 and a second flow through the second radial gap G2) can be easily achieved inside the magnetic geared electrical machine 10.

Figure 5A:
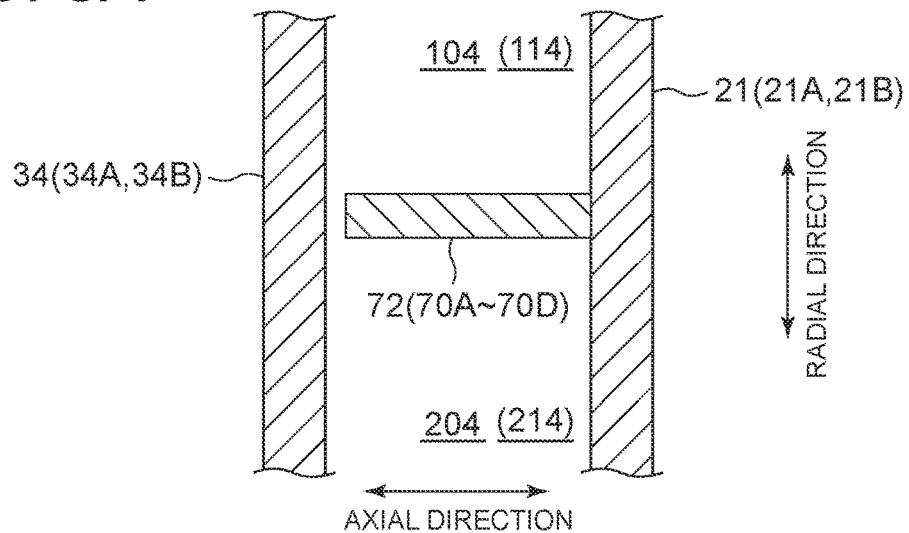
FIG. 5A is a cross-sectional view of a partition member according to an embodiment.
Figure 5B:
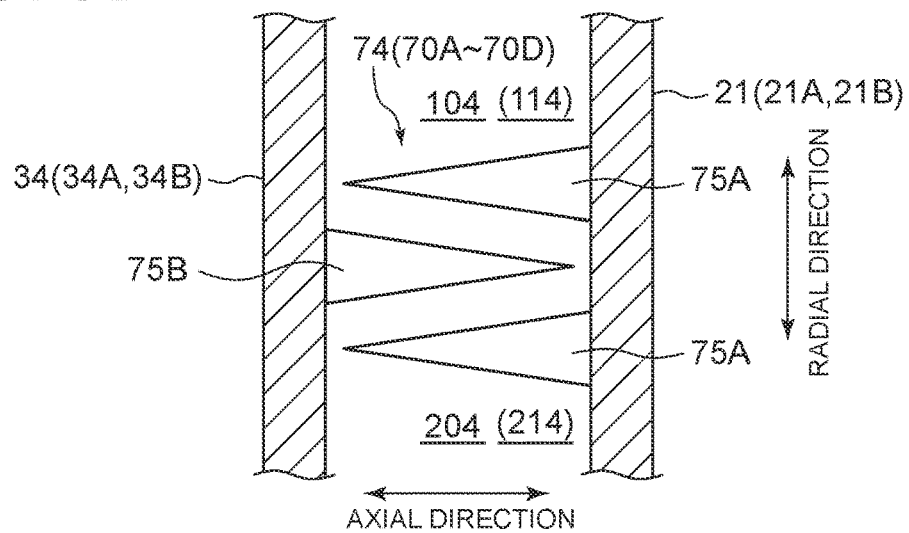
FIG. 5B is a cross-sectional view of the partition member according to another embodiment.
Figure 5C:
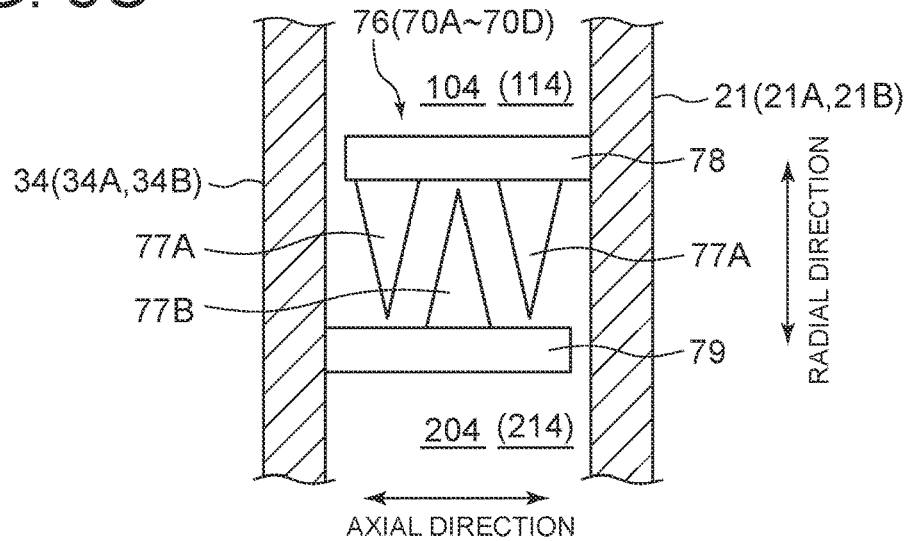
FIG. 5C is a cross-sectional view of the partition member according to another embodiment.

FIG. 5A is a cross-sectional view of a partition member 70 according to an embodiment. FIG. 5B is a cross-sectional view of the partition member 70 according to another embodiment. FIG. 5C is a cross-sectional view of the partition member 70 according to another embodiment.

As shown in FIGS. 5A to 5C, the partition member 70A is fixed to at least one of the housing 21 or the first end plate 34 of the first rotor 30.

In some embodiments, the partition member 70A includes a baffle plate 72 protruding from the housing 21 toward the first end plate 34 of the first rotor 30 or from the first end plate 34 of the first rotor 30 toward the housing 21. In this case, a simple configuration of the baffle plate 72 can be used to prevent the flow of cooling gas between the inlet cavities (104, 204) and increase the independence of the two types of flows inside the magnetic geared electrical machine 10.

In the exemplary embodiment shown in FIG. 5A, the baffle plate 72 is disposed so as to protrude from the housing 21 along the axial direction toward the first end plate 34 of the first rotor 30.

In some embodiments, the partition member 70A is a labyrinth seal 74, 76 including a stationary fin 75A, 77A disposed on a side of the housing 21 and a rotating fin 75B, 77B disposed on a side of the first rotor 30.

In this case, the labyrinth seal 74, 76 can be used to effectively prevent the flow of cooling gas between the inlet cavities (104, 204) and increase the independence of the two types of flows inside the magnetic geared electrical machine 10.

In the labyrinth seal 74 shown in FIG. 5B, the stationary fin 75A protruding from the housing 21 along the axial direction toward the first end plate 34 and the rotating fin 75B protruding from the first end plate 34 toward the housing 21 are arranged alternately in the radial direction.

The labyrinth seal 76 shown in FIG. 5C includes a support 78 protruding from the housing 21 along the axial direction toward the first end plate 34 and a support 79 protruding from the first end plate 34 toward the housing 21, and the stationary fin 75A and the rotating fin 77B are provided on the supports 78, 79, respectively. Specifically, the stationary fin 77A protrudes from the support 78 along the radial direction toward the support 79. The rotating fin 77B, which is arranged alternately with the stationary fin 77A in the axial direction, protrudes from the support 79 along the radial direction toward the support 78.

As shown in FIGS. 3 and 4, the first inlet cavity 104 may be defined by, together with the partition member 70A, which may be the baffle plate 72 or the labyrinth seal 74, 76, a radial wall 21A of the housing 21, and an axial end face of the stator 20 and a first end plate 34A of the first rotor 30, which are opposed to the radial wall 21A.

Similarly, the second inlet cavity 204 may be defined by, together with the partition member 70A, the radial wall 21A of the housing 21 and the first end plate 34A of the first rotor 30, which is opposed to the radial wall 21A.

In some embodiments, as shown in FIGS. 3 and 4, the second inlet cavity 204 communicates with an upstream intermediate cavity 56 formed inside the first rotor 30 via an inlet opening 54 in one first end plate 34A.

The upstream intermediate cavity 56 is an annular space formed between one first end plate 34A of the first rotor 30 and one second end plate 44A of the second rotor 40 opposed to the one first end plate 34A of the first rotor 30. An upstream end of the second radial gap G2 is fluidly connected to the upstream intermediate cavity 56, and the second cooling gas in the second inlet cavity 204 is introduced into the second radial gap G2 through the upstream intermediate cavity 56.

In the embodiments shown in FIG. 3, the housing 21 has a first outlet opening 112 and a second outlet opening 212.

The first outlet opening 112 communicates with a first outlet cavity 114 defined by at least the housing 21. The first outlet cavity 114 communicates with the first radial gap G1 between the stator 20 and the first rotor 30.

Similarly, the second outlet opening 212 communicates with a second outlet cavity 214 defined by at least the housing 21. The second outlet cavity 214 communicates with the second radial gap G2 between the first rotor 30 and the second rotor 40.

In the example shown in FIG. 3, the coil end formed by protruding the stator coil 24 from the stator core 23 in the axial direction faces the first outlet cavity 114.

Thus, by providing separate paths inside the magnetic geared electrical machine 10 for the cooling gas having passed through each radial gap G1, G2 to be discharged from each outlet opening (112, 212), the degree of freedom of cooling design according to the amount of heat generated or dissipated in each region on both sides of the pole pieces 32 of the magnetic geared electrical machine 10 is further improved.

In the embodiments shown in FIG. 3, a partition member 70B is disposed between the first outlet cavity 114 and the second outlet cavity 214.

By separating the outlet cavities (114, 214) by the partition member 70B, two mutually independent flows (i.e., a first flow through the first radial gap G1 and a second flow through the second radial gap G2) can be easily achieved inside the magnetic geared electrical machine 10.

The partition member 70B may be composed of the baffle plate 72 or the labyrinth seal 74, 76 described above with reference to FIGS. 5A to 5C, as well as the partition member 70A. As shown in FIG. 3, the first outlet cavity 114 may be defined by, together with the partition member 70B, which may be the baffle plate 72 or the labyrinth seal 74, 76, a radial wall 21B of the housing 21, and an axial end face of the stator 20 and a first end plate 34B of the first rotor 30, which are opposed to the radial wall 21B.

Similarly, the second outlet cavity 214 may be defined by, together with the partition member 70B, the radial wall 21B of the housing 21 and the first end plate 34B of the first rotor 30, which is opposed to the radial wall 21B.

As shown in FIG. 3, the second outlet cavity 214 communicates with a downstream intermediate cavity 58 formed inside the first rotor 30 via an outlet opening 74 in the other first end plate 34B.

The downstream intermediate cavity 58 is an annular space formed between the other first end plate 34B of the first rotor 30 and the other second end plate 44B of the second rotor 40 opposed to the other first end plate 34B of the first rotor 30. A downstream end of the second radial gap G2 is fluidly connected to the downstream intermediate cavity 58, and the second cooling gas having passed through the second radial gap G2 is introduced into the second outlet cavity 214 through the downstream intermediate cavity 58.

In some embodiments, as shown in FIG. 3, the magnetic geared electrical machine 10 includes a first circulation path 120 for returning the first cooling gas discharged from the first outlet opening 112 to the first inlet opening 102, and a first fan 122 disposed on the first circulation path 120. Further, the magnetic geared electrical machine 10 includes a second circulation path 220 for returning the second cooling gas discharged from the second outlet opening 212 to the second inlet opening 202, and a second fan 222 disposed on the second circulation path 220.

The first fan 122 and the second fan 222 are each controllable in capacity. Therefore, the flow rate of the first cooling gas through the first radial gap G1 and the flow rate of the second cooling gas through the second radial gap G2 can be adjusted independently of each other by capacity control of the first fan 122 and the second fan 222. This allows appropriate cooling according to the amount of heat generated or dissipated in each region on both sides of the pole pieces 32 of the magnetic geared electrical machine 10.

In addition, as shown in FIG. 3, the first circulation path 120 and the second circulation path 220 may be provided with heat exchangers 124, 224 for cooling the hot first cooling gas and second cooling gas through heat exchange, respectively.

In some embodiments, as shown in FIG. 4, the housing 21 has a common outlet opening 312. The common outlet opening 312 communicates with a common outlet cavity 314 defined by at least the housing 21. The common outlet cavity 314 communicates with both the first radial gap G1 between the stator 20 and the first rotor 30 and the second radial gap G2 between the first rotor 30 and the second rotor 40.

By merging the cooling gas flow having passed through each radial gap G1, G2 at the common outlet cavity 314 and discharging from the common outlet opening 312, the flow path configuration inside the magnetic geared electrical machine 10 can be simplified.

In the example shown in FIG. 4, the coil end formed by protruding the stator coil 24 from the stator core 23 in the axial direction faces the common outlet cavity 314.

In the embodiment shown in FIG. 4, the magnetic geared electrical machine 10 includes a circulation path 320 for returning the cooling gas discharged from the common outlet opening 312 to the first inlet opening 102 and the second inlet opening 202, and a common fan 322 disposed on the circulation path 320.

Downstream of the common fan 322, the circulation path 320 is divided into a first branch flow path 330 and a second branch flow path 332, which are connected to the first inlet opening 102 and the second inlet opening 202, respectively. Further, a first damper 340 is disposed on the first branch flow path 330, and a second damper 342 is disposed on the second branch flow path 332.

The flow rate of the first cooling gas through the first radial gap G1 and the flow rate of the second cooling gas through the second radial gap G2 can be adjusted independently of each other by controlling the opening degree of the first damper 340 and the second damper 342. This allows appropriate cooling according to the amount of heat generated or dissipated in each region on both sides of the pole pieces 32 of the magnetic geared electrical machine 10.

In addition, as shown in FIG. 4, the circulation path 320 may be provided with a common heat exchanger 324 for cooling the hot cooling gas through heat exchange.

In the embodiments shown in FIGS. 3 and 4, the first cooling gas flowing through the first radial gap G1 and the second cooling gas flowing through the second radial gap G2 have the same flow direction, but a configuration in which the first and second cooling gases flow in opposite directions can also be employed.

Figure 6:
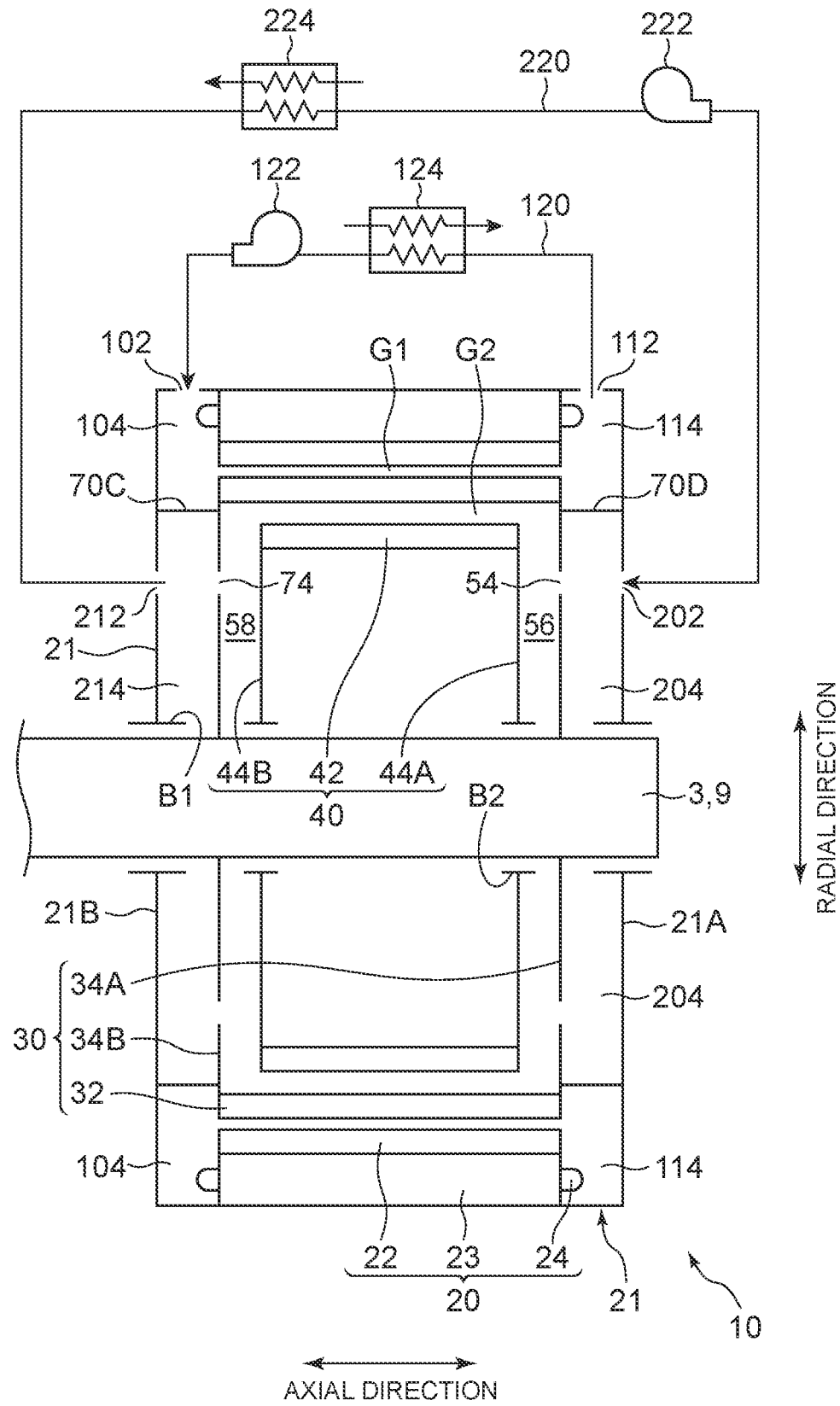
FIG. 6 is a diagram showing the magnetic geared electrical machine according to an embodiment.

FIG. 6 is a diagram showing the magnetic geared electrical machine 10 according to an embodiment.

As shown in this figure, the housing 21 has the first inlet opening 102 and the second outlet opening 212 on one end side in the axial direction, and has the first outlet opening 112 and the second inlet opening 202 on the other end side in the axial direction. Further, on one end side of the housing 21 in the axial direction, the first inlet cavity 104 and the second outlet cavity 214 adjacent to the first inlet cavity 104 in the radial direction are formed, with the first inlet opening 102 communicating with the first inlet cavity 104 and the second outlet opening 212 communicating with the second outlet cavity 214. On the other hand, on the other end side of the housing 21 in the axial direction, the first outlet cavity 114 and the second inlet cavity 204 adjacent to the first outlet cavity 114 in the radial direction are formed, with the first outlet opening 112 communicating with the first outlet cavity 114 and the second inlet opening 202 communicating with the second inlet cavity 204. The flow direction of the first cooling gas from the first inlet cavity 104 through the first radial gap G1 to the first outlet cavity 114 is opposite to the flow direction of the second cooling gas from the second inlet cavity 204 through the second radial gap G2 to the second outlet cavity 214. By flowing the first cooling gas and the second cooling gas in opposite directions, the temperature rise of the pole pieces 32 can be appropriately suppressed regardless of the axial position.

In the exemplary embodiment shown in FIG. 6, a partition member 70C is disposed between the first inlet cavity 104 and the second outlet cavity 214, and a partition member 70D is disposed between the first outlet cavity 114 and the second inlet cavity 204. The partition members 70C, 70D may be composed of the baffle plate 72 or the labyrinth seal 74, 76 described above with reference to FIGS. 5A to 5C, as well as the partition member 70A.

(Tandem Arrangement of Magnetic Geared Units)

In the embodiments shown in FIGS. 3, 4, and 6, the magnetic geared electrical machine 10 includes one set of the stator 20, the first rotor 30, and the second rotor 40, but the magnetic geared electrical machine 10 may include a plurality of magnetic geared units each of which is composed of the stator 20, the first rotor 30, and the second rotor 40.

Figure 7:
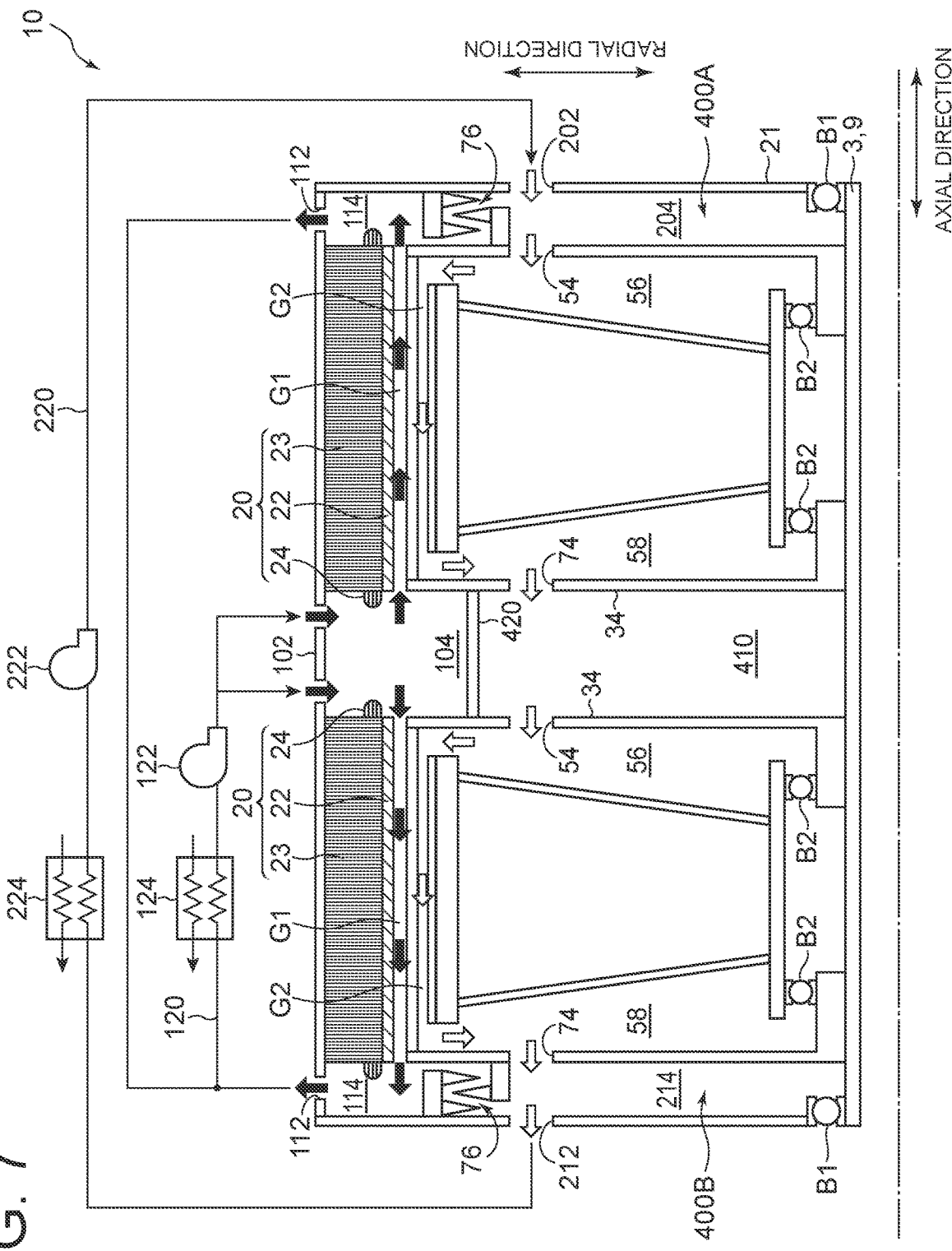
FIG. 7 is a diagram showing the magnetic geared electrical machine according to an embodiment.

FIG. 7 is a diagram showing the magnetic geared electrical machine 10 according to an embodiment.

As shown in this figure, the magnetic geared electrical machine 10 includes a plurality of magnetic geared units 400 (400A, 400B) each of which is composed of the stator 20, the first rotor 30, and the second rotor 40. The plurality of magnetic geared units 400 (400A, 400B) are arranged in the axial direction. The respective first radial gaps G1 of the magnetic geared units 400 (400A, 400B) are connected fluidly in parallel to each other so that the first cooling gas passes through the respective first radial gaps G1 of the magnetic geared units 400 (400A, 400B) in opposite directions.

In the example shown in FIG. 7, the first inlet opening 102 and the first inlet cavity 104 are disposed between a pair of magnetic geared units 400A, 400B which are adjacent in the axial direction. In this case, the first cooling gas flowing into the first inlet cavity 104 is diverted to both axial sides and passes through the respective first radial gaps G1 of the magnetic geared units 400 (400A, 400B) in opposite directions to each other. The flow path of the first cooling gas formed between the pair of axially adjacent magnetic geared units 400A, 400B may be a flow path inlet portion of the first cooling gas (first inlet opening 102 and first inlet cavity 104) as in the example in FIG. 7, or may be a flow path outlet portion of the first cooling gas (first outlet opening 112 and first outlet cavity 114). That is, in another embodiment, the first outlet opening 112 and the first outlet cavity 114 are disposed between the pair of magnetic geared units 400A, 400B which are adjacent in the axial direction. In this case, the first cooling gas having passed through the respective first radial gaps G1 of the magnetic geared units 400 (400A, 400B) in opposite directions flows into the first outlet cavity 114 between the magnetic geared units 400A, 400B and is discharged from the first outlet opening 112 between the magnetic geared units 400A, 400B.

In the example shown in FIG. 7, the first inlet openings 102 are provided at two axial positions for the two magnetic geared units 400A, 400B, but the first inlet opening 102 may be provided at one axial position for the two magnetic geared units 400A, 400B. Similarly, in the other embodiment in which the first outlet opening 112 and the first outlet cavity 114 are disposed between the pair of axially adjacent magnetic geared units 400A, 400B, the first outlet opening(s) 112 may be provided at one or more axial positions for the two magnetic geared units 400A, 400B.

The stator 20 side of the magnetic geared electrical machine 10 with respect to the pole pieces 32 is affected by the heat generated by the stator coil 24 in addition to the heat generated by the pole pieces 32 themselves, and depending on the specifications of the magnetic geared electrical machine 10, relatively high cooling performance is required. When the plurality of magnetic geared units 400 are arranged in the axial direction, if a flow path configuration is adopted such that the first cooling gas sequentially passes through the first radial gaps G1 of the plurality of magnetic geared units 400, the temperature of the first cooling gas may rise in the first radial gap G1 of the most downstream magnetic geared unit 400, resulting insufficient cooling performance.

In this regard, by adopting a flow path configuration in which the first radial gaps G1 of the magnetic geared units 400 (400A, 400B) are connected fluidly in parallel to each other as described above, compared to the flow path configuration in which the first cooling gas sequentially passes through the first radial gaps G1 of the plurality of magnetic geared units 400, the supply temperature of the first cooling gas can be reduced. As a result, it is possible to improve the cooling performance on the stator 20 side of the magnetic geared electrical machine 10 with respect to the pole pieces 32.

On the other hand, on the second rotor 40 side of the magnetic geared electrical machine 10 with respect to the pole pieces 32, not so high cooling performance may not be required.

For this reason, in the embodiment shown in FIG. 7, the second inlet opening 202 and the second inlet cavity 204 are disposed at one end of the magnetic geared electrical machine 10 in the axial direction so that the second cooling gas taken into the second inlet cavity 204 sequentially passes through the second radial gaps G2 of the plurality of magnetic geared units 400 (400A, 400B).

This allows the second inlet opening 202 and the second inlet cavity 204 to be placed at one end of the magnetic geared electrical machine 10 in the axial direction, simplifying the connection structure of the piping for introducing the second cooling gas from the outside.

When the second cooling gas sequentially passes through the second radial gaps G2 of the plurality of magnetic geared units 400 (400A, 400B), the temperature of the second cooling gas may rise at the outlet side of the second radial gap G2 of the downstream magnetic geared unit 400B, resulting insufficient cooling of the pole pieces 32. In this case, by adopting a flow path configuration in which the first cooling gas having passed through the respective first radial gaps G1 flows into the first outlet cavity 114 between the axially adjacent magnetic geared units 400A, 400B, the first cooling gas and the second cooling gas flow in opposite directions in the magnetic geared unit 400B. Thus, it is possible to appropriately suppress the temperature rise of the pole pieces 32 in the magnetic geared unit 400B, in which the temperature rise of the second cooling gas may pose a problem.

Further, in some embodiments, the magnetic geared electrical machine 10 includes a partition wall 420 connecting the first end plates 34 of the first rotors 30 of the pair of axially adjacent magnetic geared units 400A, 400B so as to separate a flow path of the first cooling gas from a flow path (central cavity 410) of the second cooling gas.

In the exemplary embodiment shown in FIG. 7, the flow path of the first cooling gas separated from the central cavity 410 by the partition wall 420 is the first inlet cavity 104 disposed between the pair of axially adjacent magnetic geared units 400A, 400B. In another embodiment, the flow path of the first cooling gas separated from the central cavity 410 by the partition wall 420 is the first outlet cavity 114 disposed between the pair of axially adjacent magnetic geared units 400A, 400B.

Since the first rotors 30 of the pair of axially adjacent magnetic geared units 400A, 400B have the same rotation speed, the flow path of the first cooling gas (first inlet cavity 104 or first outlet cavity 114) and the flow path of the second cooling gas (central cavity 410) can be easily separated by a simple structure of the partition wall 420 connecting the first rotors 30.

(Additional Modification for Partition Member)

Figure 8A:
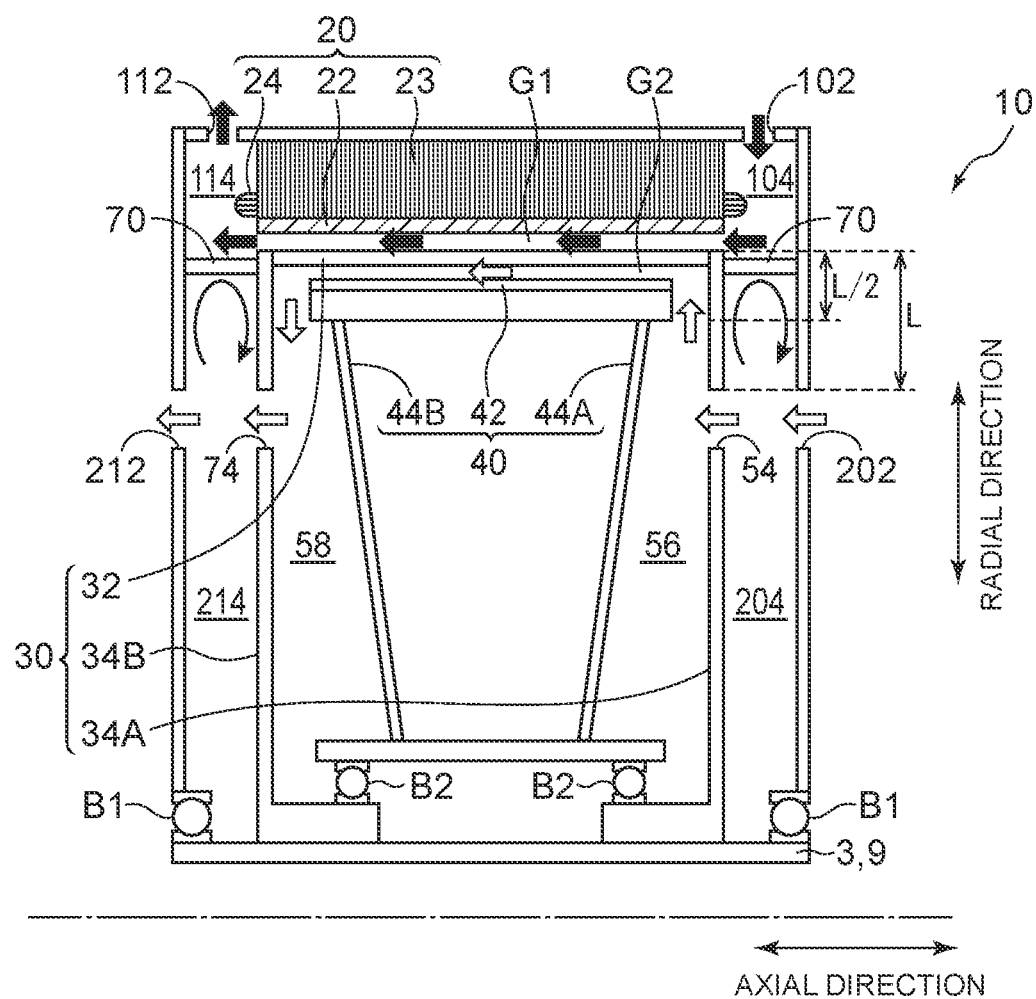
FIG. 8A is a diagram showing an arrangement example of the partition member.
Figure 8B:
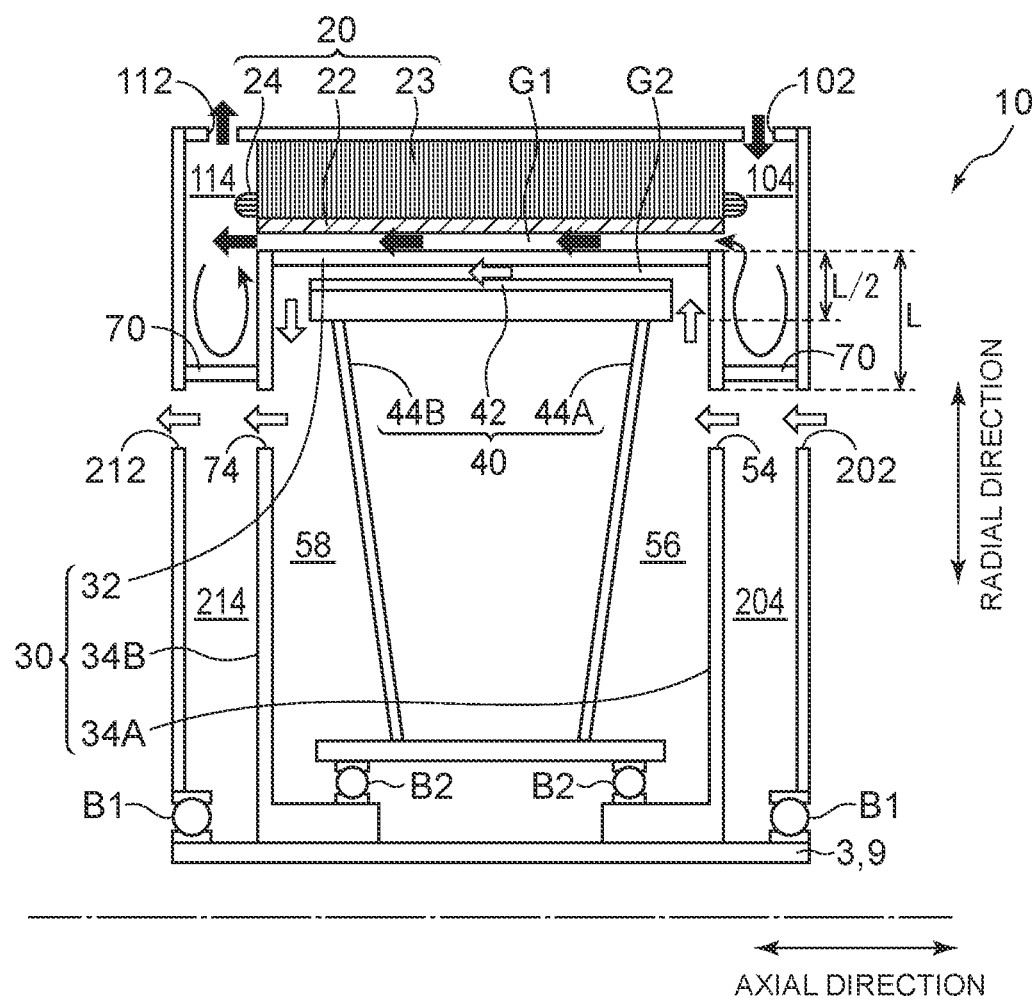
FIG. 8B is a diagram showing another arrangement example of the partition member.

FIGS. 8A and 8B are diagrams showing an arrangement example of the partition member 70.

Consider the case where a second cavity (204, 214) which is either one of the second inlet cavity 204 or the second outlet cavity 214 is disposed radially inward of a first cavity (104, 114) which is either one of the first inlet cavity 104 or the first outlet cavity 114. In this case, as shown in FIG. 8A, if the partition member 70 separating the first cavity (104, 114) from the second cavity (204, 214) is disposed near the first radial gap G1 with respect to the radial direction, due to centrifugal force, the second cooling gas forms vortices and is retained in the region radially outward of the inlet opening 54 and the outlet opening 74 of the second cavity (204, 214).

In contrast, in the example shown in FIG. 8B, the partition member 70 separating the first cavity (104, 114) from the second cavity (204, 214) is disposed closer to the inlet opening 54 and the outlet opening 74 than the first radial gap G1. In other words, the partition member 70 is disposed radially inward of the midpoint of the distance L in the radial direction between the first radial gap G1 and the inlet opening 54 or the outlet opening 74. This suppresses the retention of the second cooling gas in the second cavity (204, 214). In the first cavity (104, 114), vortices are formed radially inward of the first radial gap G1, but they flow downstream while accompanying the main flow of the first cooling gas flowing through the first inlet cavity 104, the first radial gap G1, and the first outlet cavity 114 and discharged through the first outlet opening 112, so they are difficult to stay.

FIG. 9 is a diagram showing an arrangement example of the partition member 70 according to another embodiment.

As shown in this figure, in some embodiments, a distance d between the partition member 70 separating the first cavity (104, 114) from the second cavity (204, 214) and the opening (54, 74) of the first end plate 34 is less than a radial dimension D of the opening (54, 74).

Since the radial distance d between the partition member 70 and the opening (54, 74) of the end plate (34A, 34B) is set to a relatively small value, the retention of the second cooling gas in the second cavity (204, 214) is suppressed.

(Conclusion)

Hereinafter, the overview of the magnetic geared electrical machine 10 and the power generation system 1 using the same according to some embodiments will be described.

(1) A magnetic geared electrical machine (10) according to some embodiments of the present invention includes: a stator (20) including a stator coil (24); a first rotor (30) including a plurality of pole pieces (32); a second rotor (40) including a plurality of rotor magnets (42), and arranged opposite to the stator (20) across the first rotor (30) in a radial direction; a housing (21) having a first inlet opening (102) and a second inlet opening (202), and supporting the stator (20); a first inlet cavity (104) defined by at least the housing (21) so as to communicate with the first inlet opening (102) provided in the housing (21) and with a first radial gap (G1) between the stator (20) and the first rotor (30); and a second inlet cavity (204) defined by at least the housing (21) so as to communicate with the second inlet opening (202) provided in the housing (21) and with a second radial gap (G2) between the first rotor (30) and the second rotor (40).

In the above configuration (1), two types of inlet cavities (first inlet cavity (104) and second inlet cavity (204)) respectively communicating with two types of inlet openings (first inlet opening (102) and second inlet opening (202)) in the housing (21) which supports the stator (20) are formed inside the housing (21).

Thereby, two mutually independent cooling gas flows, i.e., a first flow of cooling gas through the first radial gap (G1) and a second flow of cooling gas through the second radial gap (G2), can be formed inside the magnetic geared electrical machine (10). Herein, "mutually independent" means that the cooling gas flows in substantially separate paths from the inlet to each radial gap. Specifically, the first flow is the flow of cooling gas from the first inlet opening (102) through the first inlet cavity (104) to the first radial gap (G1). In contrast, the second flow is the flow of cooling gas from the second inlet opening (202) through the second inlet cavity (204) to the second radial gap (G2). These two types of cooling gas flows are "mutually independent" because they are substantially separate paths from the inlet opening to each radial gap.

Thus, by forming two mutually independent cooling gas flows inside the magnetic geared electrical machine (10), it is possible to easily make cooling design according to the amount of heat generated or dissipated in each region on both sides of the pole pieces (32) of the magnetic geared electrical machine (10). In contrast, for example, when the cooling gas taken in from a common inlet opening is divided in the middle and passes through the first radial gap (G1) and the second radial gap (G2), the flow distribution ratio of the cooling gas between the first radial gap (G1) and the second radial gap (G2) depends on the size of the flow path cross sections of the two gaps, so it is difficult to design a cooling system with a high degree of freedom according to the amount of heat generated or dissipated in each region on both sides of the pole pieces (32) of the magnetic geared electrical machine (10).

(2) In some embodiments, in the above configuration (1), the magnetic geared electrical machine (10) includes a partition member (70) disposed between the first inlet cavity (104) and the second inlet cavity (204).

With the above configuration (2), by separating the inlet cavities by the partition member (70), two mutually independent flows (i.e., a first flow of cooling gas through the first radial gap (G1) and a second flow of cooling gas through the second radial gap (G2)) can be easily achieved inside the magnetic geared electrical machine (10).

(3) In some embodiments, in the above configuration (2), the partition member (70) includes a labyrinth seal (74, 76) which is formed by a stationary fin disposed on a side of the housing (21) and a rotating fin disposed on a side of the first rotor (30).

With the above configuration (3), the labyrinth seal (74, 76) can be used to effectively prevent the flow of cooling gas between the inlet cavities and increase the independence of the two types of flows inside the magnetic geared electrical machine (10).

(4) In some embodiments, in the above configuration (2), the partition member (70) includes a baffle plate (72) protruding from the housing (21) toward the first rotor (30) or from the first rotor (30) toward the housing (21).

With the above configuration (4), a simple configuration of the baffle plate (72) can be used to prevent the flow of cooling gas between the inlet cavities and increase the independence of the two types of flows inside the magnetic geared electrical machine (10).

(5) In some embodiments, in any one of the above configurations (1) to (4), the magnetic gear generator (10) includes: a plurality of magnetic geared units (400) arranged in an axial direction, each of the magnetic geared units (400) being composed of the stator (20), the first rotor (30), and the second rotor (40). The respective first radial gaps (G1) of the magnetic geared units (400) are connected fluidly in parallel to each other so that a first cooling gas passes through the respective first radial gaps (G1) of the magnetic geared units (400) in opposite directions.

The stator (20) side of the magnetic geared electrical machine (10) with respect to the pole pieces (32) is affected by the heat generated by the stator coil (24) in addition to the heat generated by the pole pieces (32) themselves, and depending on the specifications of the magnetic geared electrical machine (10), relatively high cooling performance is required. When the plurality of magnetic geared units are arranged in the axial direction, if a flow path configuration is adopted such that the first cooling gas sequentially passes through the first radial gaps (G1) of the plurality of magnetic geared units (i.e., a flow path configuration in which the first radial gaps G1 are connected in series), the temperature of the first cooling gas may rise in the first radial gap (G1) of the most downstream magnetic geared unit, resulting insufficient cooling performance.

In this regard, with the above configuration (5), by adopting a flow path configuration in which the first radial gaps (G1) of the magnetic geared units are connected in parallel to each other, compared to the flow path configuration in which the first cooling gas sequentially passes through the first radial gaps (G1), the supply temperature of the first cooling gas can be reduced. As a result, it is possible to improve the cooling performance on the stator (20) side of the magnetic geared electrical machine (10) with respect to the pole pieces (32).

(6) In some embodiments, in the above configuration (5), the second inlet opening (202) and the second inlet cavity (204) are disposed at one end of the magnetic geared electrical machine (10) in the axial direction so that a second cooling gas taken into the second inlet cavity (204) sequentially passes through the second radial gaps (G2) of the plurality of magnetic geared units (400).

With the above configuration (6), the second inlet opening (202) and the second inlet cavity (204) can be placed at one end of the magnetic geared electrical machine (10) in the axial direction, simplifying the connection structure of the piping for introducing the second cooling gas from the outside.

(7) In some embodiments, in the above configuration (6), the magnetic gear generator (10) includes a partition wall (420) connecting the first rotors (30) of a pair of magnetic geared units (400) which are adjacent in the axial direction so as to separate a flow path of the first cooling gas from a flow path of the second cooling gas.

With the above configuration (7), since the first rotors (30) of the pair of axially adjacent magnetic geared units (400) have the same rotation speed, the flow path of the first cooling gas and the flow path of the second cooling gas can be easily separated by a simple structure of the partition wall (420) connecting the first rotors (30).

(8) In some embodiments, in any one of the above configurations (1) to (7), the housing (21) has a first outlet opening (112) and a second outlet opening (212). The magnetic geared electrical machine (10) includes: a first outlet cavity (112) defined by at least the housing (21) so as to communicate with the first outlet opening (112) provided in the housing (21) and with the first radial gap (G1); and a second outlet cavity (214) defined by at least the housing (21) so as to communicate with the second outlet opening (212) provided in the housing (21) and with the second radial gap (G2).

With the above configuration (8), by providing separate paths in the magnetic geared electrical machine (10) for the cooling gas having passed through each radial gap to be discharged from each outlet opening, the degree of freedom of cooling design according to the amount of heat generated or dissipated in each region on both sides of the pole pieces (32) of the magnetic geared electrical machine (10) is further improved.

For example, the flow rate of the first cooling gas through the first radial gap (G1) and the flow rate of the second cooling gas through the second radial gap (G2) may be adjusted independently of each other by adjusting design parameters such as the presence or absence of contraction and the opening area of contraction for each path until the cooling gas after passing through each radial gap is discharged from each outlet opening.

(9) In some embodiments, in the above configuration (8), the magnetic gear generator (10) includes a plurality of magnetic geared units (400) arranged in an axial direction, each of the magnetic geared units (400) being composed of the stator (20), the first rotor (30), and the second rotor (40). The first outlet opening (112) and the first outlet cavity (114) are disposed between a pair of magnetic geared units (400) which are adjacent in the axial direction so that a first cooling gas that has passed through the respective first radial gaps (G1) of the pair of magnetic geared units (400) in opposite directions flows into the first outlet cavity (114).

When the second cooling gas sequentially passes through the second radial gaps (G2) of the plurality of magnetic geared units 400 (400A, 400B), the temperature of the second cooling gas may rise at the outlet side of the second radial gap (G2) of the downstream magnetic geared unit (400B), resulting insufficient cooling.

In this regard, as in the above (9), by adopting a flow path configuration in which the first cooling gas having passed through the respective first radial gaps (G1) flows into the first outlet cavity (114) between the axially adjacent magnetic geared units (400A, 400B), the first cooling gas and the second cooling gas flow in opposite directions in the magnetic geared unit (400B) on the downstream side with respect to the flow of the second cooling gas. Thus, it is possible to appropriately suppress the temperature rise of the pole pieces (32) in the downstream magnetic geared unit (400B), in which the temperature rise of the second cooling gas may pose a problem.

(10) In some embodiments, in the above configuration (8) or (9), the magnetic geared electrical machine (10) includes: a first circulation path for returning a first cooling gas discharged from the first outlet opening (112) to the first inlet opening (102); a second circulation path for returning a second cooling gas discharged from the second outlet opening (212) to the second inlet opening (202); a first fan with controllable capacity disposed on the first circulation path; and a second fan with controllable capacity disposed on the second circulation path.

With the above configuration (10), by independently controlling the capacity of the first and second fans, the flow rate of the first cooling gas passing through the first radial gap (G1) and the flow rate of the second cooling gas passing through the second radial gap (G2) can be adjusted independently of each other. This allows appropriate cooling according to the amount of heat generated or dissipated in each region on both sides of the pole pieces (32) of the magnetic geared electrical machine (10).

(11) In some embodiments, in any one of the above configurations (8) to (10), the housing (21) has the first inlet opening (102) and the second outlet opening (212) on one end side in an axial direction with respect to the stator (20), the first rotor (30), and the second rotor (40), and has the first outlet opening (112) and the second inlet opening (202) on another end side in the axial direction.

With the above configuration (11), the flow direction of the first cooling gas in the first radial gap (G1) and the flow direction of the second cooling gas in the second radial gap (G2) are opposite (counter flow), and the temperature rise of the pole pieces (32) can be appropriately suppressed regardless of the axial position.

(12) In some embodiments, in any one of the above configurations (8) to (11), the stator (20) is disposed radially outward of the second rotor (40) with the first rotor (30) interposed therebetween. The first rotor (30) includes a pair of end plates disposed at both axial ends of the plurality of pole pieces (32) and having an opening communicating with the second radial gap (G2). The magnetic geared electrical machine comprises a partition member (70) disposed between a first cavity which is either one of the first inlet cavity (104) or the first outlet cavity (114) and a second cavity which is the second inlet cavity (204) or the second outlet cavity (214) that is disposed radially inward of the first cavity. The partition member (70) is disposed radially inward of a center position in the radial direction between the first radial gap (G1) and the opening.

With the above configuration (12), since the partition member (70) is disposed radially inward of the center position between the first radial gap (G1) and the opening in the end plate to separate the first cavity from the second cavity, the retention of the second cooling gas in the second cavity is suppressed.

(13) In some embodiments, in any one of the above configurations (8) to (12), the stator (20) is disposed radially outward of the second rotor (40) with the first rotor (30) interposed therebetween. The first rotor (30) includes a pair of end plates disposed at both axial ends of the plurality of pole pieces (32) and having an opening communicating with the second radial gap (G2). The magnetic geared electrical machine comprises a partition member (70) disposed between a first cavity which is either one of the first inlet cavity (104) or the first outlet cavity (114) and a second cavity which is the second inlet cavity (204) or the second outlet cavity (214) that is disposed radially inward of the first cavity. A distance in the radial direction between the partition member (70) and the opening is less than a radial dimension of the opening.

With the above configuration (13), since the radial distance between the partition member (70) separating the first cavity from the second cavity and the opening of the end plate is set to a relatively small value, the retention of the second cooling gas in the second cavity is suppressed.

(14) In some embodiments, in any one of the above configurations (1) to (4), the housing (21) has a common outlet opening (312). The magnetic geared electrical machine (10) includes a common outlet cavity (314) defined by at least the housing (21) so as to communicate with the common outlet opening (312) provided in the housing (21) and with both the first radial gap (G1) and the second radial gap (G2).

With the above configuration (14), by merging the cooling gas flow having passed through each radial gap at the common outlet cavity and discharging from the common outlet opening (312), the flow path configuration inside the magnetic geared electrical machine (10) can be simplified. It is also advantageous in that it reduces the number of cooling gas outlet pipes connected to the common outlet opening (312) and enables a compact outlet piping layout.

(15) A power generation system (1) according to some embodiments of the present disclosure includes: a prime mover (2); and a magnetic geared generator (10) driven by the prime mover (2). The magnetic geared generator is configured by the magnetic geared electrical machine (10) described in any one of the above (1) to (14).

With the above configuration (15), as described in the above (1), since two types of inlet cavities (first inlet cavity (104) and second inlet cavity (204)) respectively communicating with two types of inlet openings (first inlet opening (102) and second inlet opening (202)) in the housing (21) which supports the stator (20) are formed inside the housing (21), it is possible to easily make cooling design according to the amount of heat generated or dissipated in each region on both sides of the pole pieces (32) of the magnetic geared electrical machine (10).

Embodiments of the present invention were described in detail above, but the present invention is not limited thereto, and various amendments and modifications may be implemented.

For example, the magnetic geared electrical machine 10 may include a cooling jacket for cooling the stator 20. The cooling jacket may be disposed between the stator core 23 and the housing 21 in the radial direction, or may be disposed inside the stator core 23. The cooling jacket is supplied with a cooling medium (for example, cooling water or cooling air) via a cooling medium supply pipe (not shown) connected to the cooling jacket. The cooling medium increased in temperature by taking heat from the stator 20 is discharged from a cooling medium discharge pipe (not shown) connected to the cooling jacket.

In the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

REFERENCE SIGNS LIST

1 Power generation system
2 Prime mover
3, 9 Rotational shaft
4 Power supply destination
6 Power supply source
8 Rotating machine
10 Magnetic geared electrical machine
10A Magnetic geared generator
10B Magnetic geared motor
20 Stator
21 Housing
21A, 21B Radial wall
22 Stator magnet
23 Stator core
24 Stator coil
25 Slot
30 First rotor
32 Pole piece
33 Non-magnetic member
34, 34A, 34B First end plate
40 Second rotor
42 Rotor magnet
43 Rotor core
44, 44A, 44B Second end plate
45 Closure member
54, 74, 212 Opening
56 Upstream intermediate cavity
58 Downstream intermediate cavity
70, 70A, 70B, 70C, 70D Partition member
72 Baffle plate
74 Labyrinth seal
74, 76 Labyrinth seal
75A, 77A Stationary fin
75B, 77B Rotating fin
78, 79 Support
102 First inlet opening
104 First inlet cavity
112 First outlet opening
114 First outlet cavity 120 First circulation path
122 First fan
124, 224 Heat exchanger
202 Second inlet opening
204 Second inlet cavity
212 Second outlet opening
214 Second outlet cavity
220 Second circulation path
222 Second fan
312 Common outlet opening
314 Common outlet cavity
320 Circulation path
322 Common fan
324 Common heat exchanger
330 First branch flow path
332 Second branch flow path
340 First damper
342 Second damper
400, 400A, 400B Magnetic geared unit
410 Central cavity
420 Partition wall
B1, B2 Bearing
G1 First radial gap
G2 Second radial gap

The invention claimed is:

1. A magnetic geared electrical machine, comprising:
a stator including a stator coil;
a first rotor including a plurality of pole pieces;
a second rotor including a plurality of rotor magnets, and arranged opposite to the stator across the first rotor in a radial direction;
a housing having a first inlet opening and a second inlet opening, and supporting the stator;
a first inlet cavity defined by at least the housing so as to communicate with the first inlet opening provided in the housing and with a first radial gap between the stator and the first rotor; and
a second inlet cavity defined by at least the housing so as to communicate with the second inlet opening provided in the housing and with a second radial gap between the first rotor and the second rotor.

2. The magnetic geared electrical machine according to claim 1, further comprising a partition member disposed between the first inlet cavity and the second inlet cavity.

3. The magnetic geared electrical machine according to claim 2, wherein the partition member includes a labyrinth seal which is formed by a stationary fin disposed on a side of the housing and a rotating fin disposed on a side of the first rotor.

4. The magnetic geared electrical machine according to claim 2, wherein the partition member includes a baffle plate protruding from the housing toward the first rotor or from the first rotor toward the housing.

5. The magnetic geared electrical machine according to claim 1, further comprising:
a plurality of magnetic geared units arranged in an axial direction, each of the magnetic geared units being composed of the stator, the first rotor, and the second rotor, wherein
the respective first radial gaps of the magnetic geared units are connected fluidly in parallel to each other so that a first cooling gas passes through the respective first radial gaps of the magnetic geared units in opposite directions.

6. The magnetic geared electrical machine according to claim 5, wherein the second inlet opening and the second inlet cavity are disposed at one end of the magnetic geared electrical machine in the axial direction so that a second cooling gas taken into the second inlet cavity sequentially passes through the second radial gaps of the plurality of magnetic geared units.

7. The magnetic geared electrical machine according to claim 6, further comprising a partition wall connecting the first rotors of a pair of magnetic geared units which are adjacent in the axial direction so as to separate a flow path of the first cooling gas from a flow path of the second cooling gas.

8. The magnetic geared electrical machine according to claim 1, wherein
the housing has a first outlet opening and a second outlet opening, and
the magnetic geared electrical machine comprises:
a first outlet cavity defined by at least the housing so as to communicate with the first outlet opening provided in the housing and with the first radial gap; and
a second outlet cavity defined by at least the housing so as to communicate with the second outlet opening provided in the housing and with the second radial gap.

9. The magnetic geared electrical machine according to claim 8, further comprising:
a plurality of magnetic geared units arranged in an axial direction, each of the magnetic geared units being composed of the stator, the first rotor, and the second rotor, wherein
the first outlet opening and the first outlet cavity are disposed between a pair of magnetic geared units which are adjacent in the axial direction so that a first cooling gas that has passed through the respective first radial gaps of the pair of magnetic geared units in opposite directions flows into the first outlet cavity.

10. The magnetic geared electrical machine according to claim 8, further comprising:
a first circulation path for returning a first cooling gas discharged from the first outlet opening to the first inlet opening;
a second circulation path for returning a second cooling gas discharged from the second outlet opening to the second inlet opening;
a first fan with controllable capacity disposed on the first circulation path; and
a second fan with controllable capacity disposed on the second circulation path.

11. The magnetic geared electrical machine according to claim 8, wherein the housing has the first inlet opening and the second outlet opening on one end side in an axial direction with respect to the stator, the first rotor, and the second rotor, and has the first outlet opening and the second inlet opening on another end side in the axial direction.

12. The magnetic geared electrical machine according to claim 8, wherein
the stator is disposed radially outward of the second rotor with the first rotor interposed therebetween,
the first rotor includes a pair of end plates disposed at both axial ends of the plurality of pole pieces and having an opening communicating with the second radial gap,
the magnetic geared electrical machine comprises a partition member disposed between a first cavity which is either one of the first inlet cavity or the first outlet cavity and a second cavity which is the second inlet cavity or the second outlet cavity that is disposed radially inward of the first cavity, and the partition member is disposed radially inward of a center position in the radial direction between the first radial gap and the opening.

13. The magnetic geared electrical machine according to claim 8, wherein the stator is disposed radially outward of the second rotor with the first rotor interposed therebetween, the first rotor includes a pair of end plates disposed at both axial ends of the plurality of pole pieces and having an opening communicating with the second radial gap, the magnetic geared electrical machine comprises a partition member disposed between a first cavity which is either one of the first inlet cavity or the first outlet cavity and a second cavity which is the second inlet cavity or the second outlet cavity that is disposed radially inward of the first cavity, and a distance in the radial direction between the partition member and the opening is less than a radial dimension of the opening.

14. The magnetic geared electrical machine according to claim 1, wherein the housing has a common outlet opening, and the magnetic geared electrical machine comprises a common outlet cavity defined by at least the housing so as to communicate with the common outlet opening provided in the housing and with both the first radial gap and the second radial gap.

15. A power generation system, comprising:

a prime mover; and a magnetic geared generator driven by the prime mover, wherein the magnetic geared generator is configured by the magnetic geared electrical machine according to claim 1.

* * * * *